(12) United States Patent
Phui

(10) Patent No.: US 11,002,224 B2
(45) Date of Patent: May 11, 2021

(54) BOOST TURBO-PUMP WITH AXIALLY FED TURBINE

(71) Applicant: Aerojet Rocketdyne, Inc., Sacramento, CA (US)

(72) Inventor: Khin Phui, Sacramento, CA (US)

(73) Assignee: Aerojet Rocketdyne, Inc., Canoga Park, CA (US)

( * ) Notice: Subject to any disclaimer, the term of this patent is extended or adjusted under 35 U.S.C. 154(b) by 276 days.

(21) Appl. No.: 16/316,666

(22) PCT Filed: Jul. 20, 2017

(86) PCT No.: PCT/US2017/042986
§ 371 (c)(1),
(2) Date: Jan. 10, 2019

(87) PCT Pub. No.: WO2018/017788
PCT Pub. Date: Jan. 25, 2018

(65) Prior Publication Data
US 2019/0153979 A1    May 23, 2019

Related U.S. Application Data

(60) Provisional application No. 62/365,625, filed on Jul. 22, 2016.

(51) Int. Cl.
*F02K 9/48* (2006.01)
*F04D 7/00* (2006.01)
(Continued)

(52) U.S. Cl.
CPC ............... *F02K 9/48* (2013.01); *B64G 1/401* (2013.01); *F04D 7/00* (2013.01); *F04D 29/548* (2013.01); *F04D 3/00* (2013.01); *F05D 2260/60* (2013.01)

(58) Field of Classification Search
CPC ..... F02K 9/46; F02K 9/48; F02K 9/50; F02K 9/42; F04D 25/045
See application file for complete search history.

(56) References Cited

U.S. PATENT DOCUMENTS 4,771,599 A * 9/1988 Brown ...................... F02K 9/42
                                                                239/419.3
5,232,333 A    8/1993 Girault
(Continued)

FOREIGN PATENT DOCUMENTS

FR          2232685          1/1975

OTHER PUBLICATIONS

International Preliminary Report on Patentability for International Application No. PCT/US2017/042986 dated Jan. 31, 2019.
(Continued)

*Primary Examiner* — Gerald L Sung

(57) ABSTRACT

A liquid propellant rocket engine includes a main turbo-pump and a boost turbo-pump. The main turbo-pump has a main pump with an outlet that is fluidly coupled with a supply line. The boost turbo-pump includes a housing, a rotor, a boost pump, and a turbine. The boost pump includes a first portion of the housing and a first portion the rotor. The turbine includes a second portion of the housing and a second portion of the rotor. The turbine has turbine blades attached to the second portion of the rotor and an inlet fluidly coupled with the supply line. The turbine has a plurality of circumferentially disposed feed lines defined by the second portion of the housing and not the first portion of the housing. The feed lines are fluidly coupled between the inlet and the turbine blades. The feed lines have an acute angle turn.

5 Claims, 3 Drawing Sheets

(51) Int. Cl.
    *F04D 29/54*     (2006.01)
    *B64G 1/40*     (2006.01)
    *F04D 3/00*     (2006.01)

(56) References Cited

U.S. PATENT DOCUMENTS

| | | | | |
|---|---|---|---|---|
| 6,321,528 B1* | 11/2001 | Polyanchik | ............. | F01D 25/12 |
| | | | | 415/116 |
| 2007/0006568 A1* | 1/2007 | Fowler | ...................... | F02K 9/48 |
| | | | | 60/204 |

OTHER PUBLICATIONS

International Search Report for International Application No. PCT/US2017/042986 dated Oct. 11, 2017.

* cited by examiner

BOOST TURBO-PUMP WITH AXIALLY FED TURBINE

CROSS-REFERENCE TO RELATED APPLICATION

The present disclosure claims priority to U.S. Provisional Patent Application No. 62/365,625, filed Jul. 22, 2016.

BACKGROUND

A liquid propellant rocket engine may utilize liquid oxygen as a propellant. Prior to combustion, the liquid oxygen is pressurized in a series of pumps, including an oxygen boost pump and a main turbo-pump. The oxygen boost pump includes a turbine section and a pump section. The pump section increases the pressure of relatively low pressure liquid oxygen from a storage tank. The liquid oxygen is then fed to the main turbo-pump to further increase pressure.

A portion of the liquid oxygen from the main turbo-pump is diverted to a bleed line and fed to the turbine section in the oxygen boost pump. The turbine section drives the pump section in the oxygen boost pump. To use an axial turbine, and thus an axial feed of the liquid oxygen bleed to the turbine, a turbine inlet is accommodated through the pump section. For example, the turbine inlet extends through a vane in the pump section.

SUMMARY

A liquid propellant rocket engine according to an example of the present disclosure includes a main turbo-pump and a boost turbo-pump. The main turbo-pump has a main pump with an outlet that is fluidly coupled with a supply line. The boost turbo-pump has a housing, a rotor, a boost pump that includes a first portion of the housing and a first portion the rotor, and a turbine that has a second portion of the housing and a second portion of the rotor. The turbine has turbine blades attached to the second portion of the rotor. The turbine has an inlet fluidly coupled with the supply line. The turbine has a plurality of circumferentially disposed feed lines defined by the second portion of the housing and not the first portion of the housing. The circumferentially disposed feed lines are fluidly coupled between the inlet and the turbine blades. The circumferentially disposed feed lines have an acute angle turn.

In a further embodiment of any of the foregoing embodiments, the acute angle turn is approximately 60 degrees.

In a further embodiment of any of the foregoing embodiments, the boost pump has an inlet fluidly connected between an inducer attached to the first portion of the rotor and a liquid oxygen supply tank.

A liquid propellant rocket engine according to an example of the present disclosure includes a main turbo-pump that has a supply line, and a boost turbo-pump. The boost turbo-pump has a housing, a rotor, an axial boost pump that has inducer blades on a first portion of the rotor and vanes on a first portion of the housing, and an axial turbine that has turbine blades on a second portion of the rotor. The housing defines a plurality of feed lines leading into the axial turbine. The feed lines each have a turn that is radially inboard of the vanes of the boost pump but that does not extend through the vanes.

In a further embodiment of any of the foregoing embodiments, the turn is at an acute angle of less than 90 degrees.

In a further embodiment of any of the foregoing embodiments, the turn is about 60 degrees.

In a further embodiment of any of the foregoing embodiments, the feed lines into the axial turbine are fluidly connected with the supply line.

In a further embodiment of any of the foregoing embodiments, the housing defines a pump outlet from the axial boost pump and a turbine outlet from the axial turbine, and the turbine outlet opens into the pump outlet.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
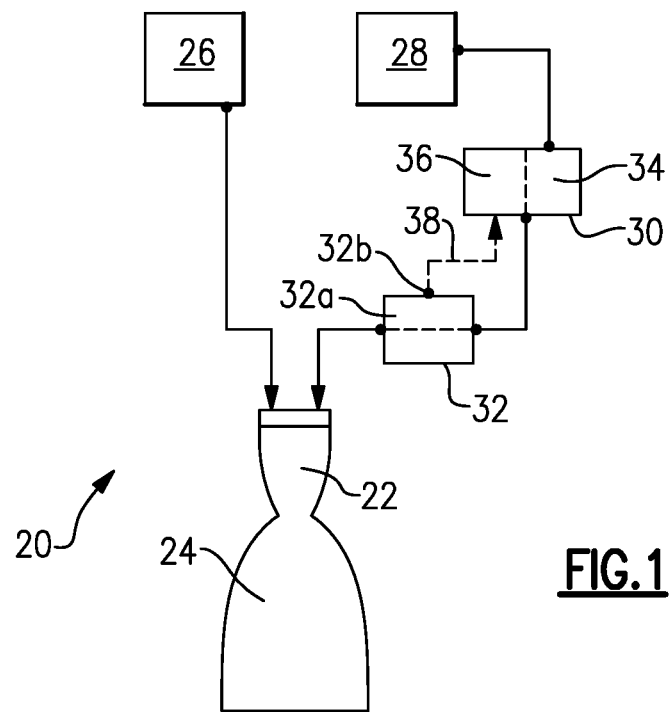
FIG. 1 illustrates an example liquid propellant rocket engine.

FIG. 1 schematically illustrates an example liquid propellant rocket engine 20. The rocket engine 20 includes a combustion chamber 22 and a nozzle 24. The rocket engine 20 generates thrust from fuel, in fuel tank 26, and liquid oxygen, in liquid oxygen tank 28. The fuel and liquid oxygen are burned in the combustion chamber 22 and the combustion gases are accelerated through a throat before discharge through nozzle 24 to generate thrust.

Prior to delivery into the combustion chamber 22, the liquid oxygen is pressurized. In this example, the liquid oxygen is first pressurized in a boost turbo-pump 30 ("BTP 30") and then further pressurized in a main turbo-pump 32 ("MTP 32") that has a main pump 32a. The BTP 30 includes a boost pump 34 and a turbine 36. The boost pump 34 pressurizes the liquid oxygen.

The liquid oxygen is then fed from the boost pump 34 to the MTP 32. A portion of the liquid oxygen is fed from an outlet 32b of the main pump 32a through a supply line 38 back to the BTP 30. This liquid oxygen is fed into the turbine 36 of the BTP 30. The liquid oxygen expands in the turbine 36, to drive the boost pump 34.

Figure 2:
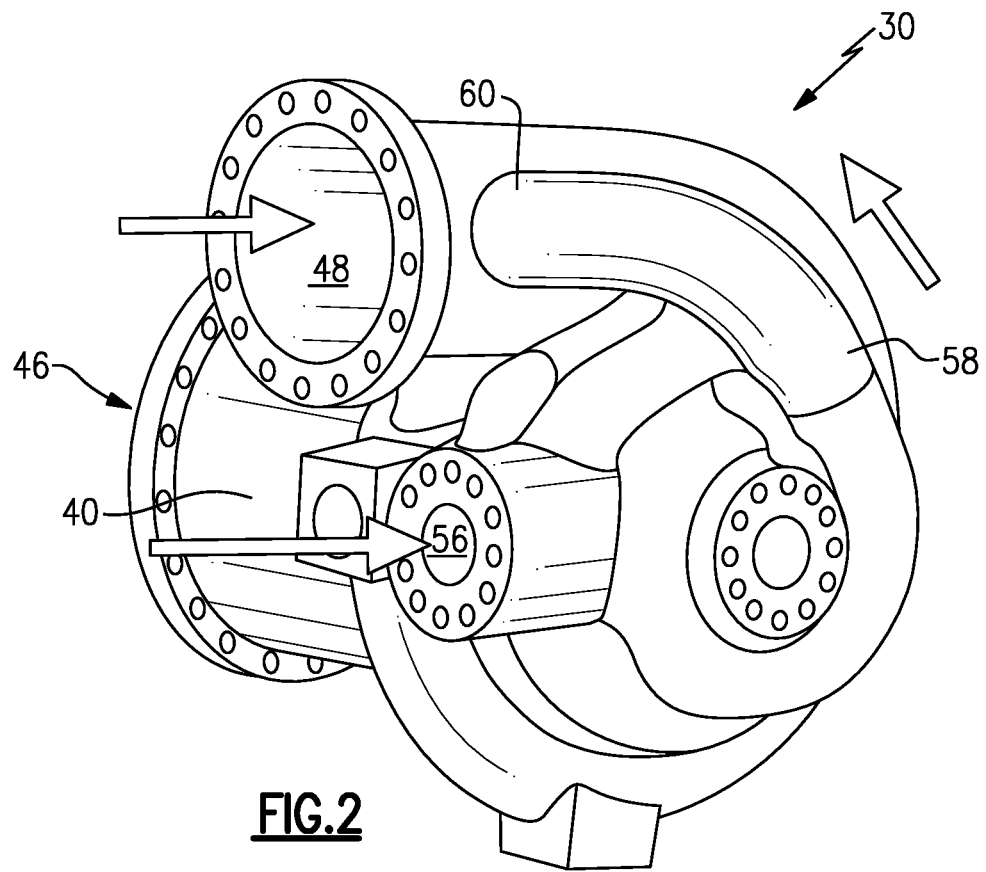
FIG. 2 illustrates a perspective view of an boost turbo-pump of the rocket engine.
Figure 3B:
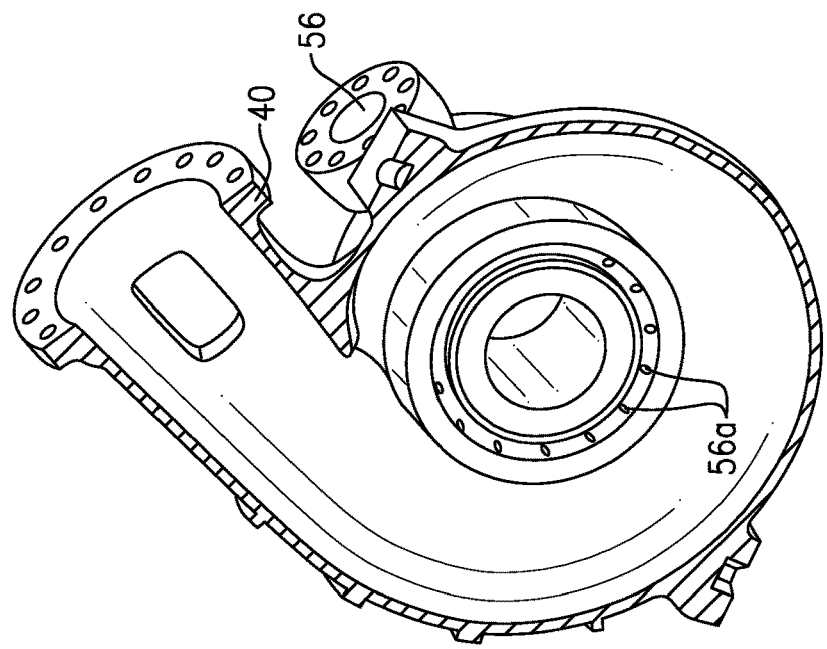
FIG. 3B illustrates a sectioned view of portions of the boost turbo-pump.
Figure 3A:
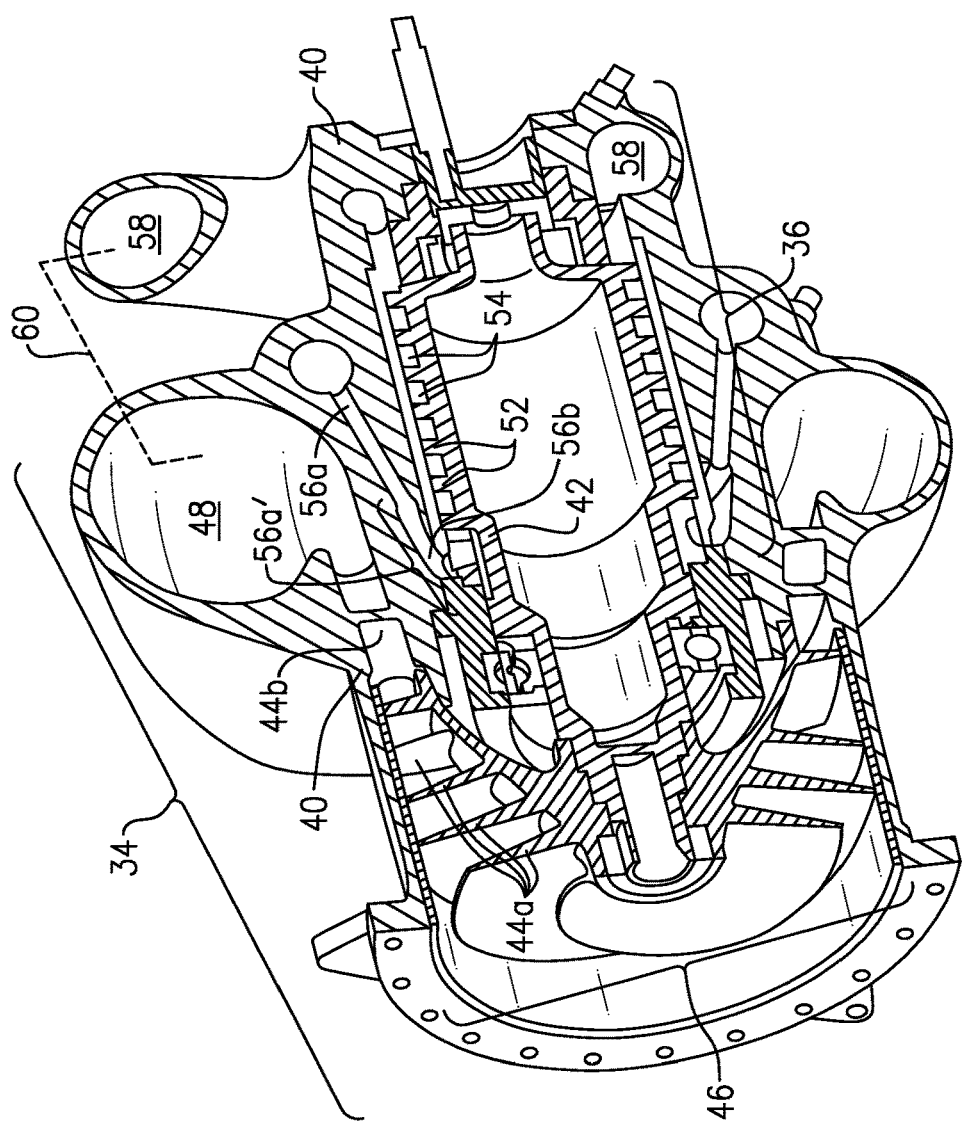
FIG. 3A illustrates a sectioned view of the boost turbo-pump.

FIG. 2 illustrates a perspective view of the BTP 30; FIG. 3A illustrates a sectioned view of the BTP 30; and FIG. 3B illustrates a sectioned view of selected portions of the BTP 30 taken perpendicular to the central rotational axis of the BTP 30. The BTP 30 includes a housing 40. The boost pump 34 generally includes one portion of the housing 40 and the turbine 36 includes another, second portion of the housing 40. The boost pump 34 and the turbine 36 also share a common rotor 42. Similar to the housing 40, the boost pump 34 includes a portion of the rotor 42 and the turbine 36 includes another, second portion of the rotor 42.

The boost pump 34 includes circumferential rows of inducer blades 44a, and a circumferential row of vanes 44b downstream of the inducer blades 44. The housing 40 defines a pump inlet 46 leading into the inducer blades 44 and a pump outlet 48 leading out from the vanes 44b. The boost pump 34 is axial, and thus the liquid oxygen from the liquid oxygen tank 28 is fed axially into the pump inlet 46.

With respect to central axes of the pump inlet 46 and the pump outlet 48, the inlet 46 and outlet 48 are oriented transverse to each other.

The portion of the rotor 42 in the turbine 36 includes a plurality of rows of turbine blades 52 attached thereto, and vanes 54 interposed between rows of the blades 52. Since the boost pump 34 and the turbine 36 are mounted on the common rotor 42, expansion of the liquid oxygen through the turbine 36 drives rotation of the boost pump 34.

Figure 4:
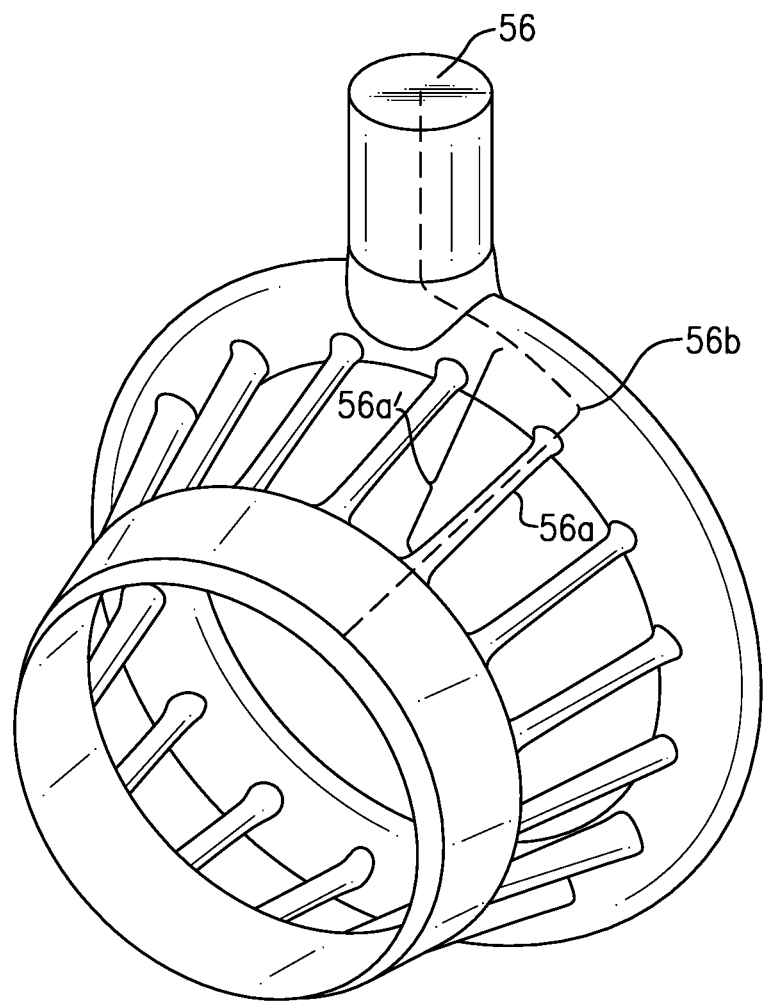
FIG. 4 illustrates an isolated view of solid surfaces of feed lines in the boost turbo-pump.

The housing 40 defines a turbine inlet 56 and a turbine outlet 58. The turbine inlet 56 includes a plurality of circumferentially disposed feed lines 56a that lead into the turbine blades 52. The feed lines 56a are also shown in an isolated, solid surface view in FIG. 4. The turbine inlet 56 is fluidly connected with the supply line 38 from the MTP 32. The turbine outlet 58 opens into the pump outlet 48, as represented at 60 (FIG. 2).

The turbine 36 is axial, and thus the liquid oxygen from the supply line 38 is fed axially into the turbine 36. However, the presence of the boost pump 34 hinders feeding of the liquid oxygen axially into the turbine 36. In similar turbo-pumps, an inlet into the turbine would be provided through the vane or vanes in the boost pump. This often requires the geometry of the vanes be designed to accommodate an inlet passage there through, thereby competing with geometries that have better pumping efficiency.

In the BTP 30, rather than having an inlet through the vanes 44c, the housing 40 defines the feed lines 56a into the turbine 36. The feed lines 56a each include an acute angle turn, represented at 56b (see FIG. 4). With regard to the angle of the turn, the rotor 42 is the axis of symmetry. Upstream is towards the boost pump 34, and downstream is towards the turbine 36 (0 degrees). The feed lines 56a enter the second section of the housing 40 in an upstream direction, moving radially inward towards the rotor 42 along a vector that forms an angle of approximately 215 degrees with the downstream direction. The feed lines 56a turn, at acute angles 56b, smoothly to a downstream direction generally parallel to the axis of symmetry. The acute angle turn 56b is less than 90 degrees. In the illustrated example, the acute angle turn 56b is approximately 60 degrees. In this way, the boost pump 34 and the turbine 36 are fed from a common axial direction, which in FIG. 3 is generally axially from left to right.

Due to the turning of the feed lines 56a, the feed lines 56a can be included outside of the envelope of the boost pump 34 and, more specifically, outside of the portion of the housing 40 included in the boost pump 34. For instance, a section (represented at 56a') of the passage 56a is radially inboard of the circumferential row of vanes 44c of the boost pump 34 but does not extend through the vanes 44 or the housing 40 in the boost pump 34. That is, the acute angle turn 56b of the feed lines 56a permits the feed lines 56a to be packaged within a limited amount of space, outside of the boost pump 34. As a result, the vanes 44c need not be shaped to accommodate an inlet. Instead, the vanes 44c can be shaped for enhanced pumping efficiency. Similarly, the size of the feed lines 56a is not constrained by the size or geometry of the vanes 44c and can thus be made at least somewhat larger for greater input into the turbine 36. This enables better performance as the flow paths through the vane would have a small diameter, thereby causing substantial pressure drop. Here, the feed lines 56a can be fewer and have a greater diameter, thereby reducing lower pressure drop. Moreover, manufacturing is less expensive as there are fewer features and the packaging is more compact.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A liquid propellant rocket engine comprising:
a main turbo-pump having a main pump having an outlet fluidly coupled with a supply line;
and a boost turbo-pump having a housing;
a rotor;
a boost pump including a first portion of the housing and a first portion the rotor; and
a turbine including a second portion of the housing and a second portion of the rotor, wherein the turbine has turbine blades attached to the second portion of the rotor, wherein the turbine has an inlet fluidly coupled with the supply line, wherein the turbine has a plurality of circumferentially disposed feed lines defined by the second portion of the housing and not the first portion of the housing, wherein the plurality of circumferentially disposed feed lines are fluidly coupled between the inlet and the turbine blades, wherein the plurality of circumferentially disposed feed lines have an acute angle turn.

2. The liquid propellant rocket engine as recited in claim 1, wherein the boost pump has an inlet fluidly connected between an inducer attached to the first portion of the rotor and a liquid oxygen supply tank.

3. A liquid propellant rocket engine comprising:
a main turbo-pump having a supply line; and
a boost turbo-pump, the boost turbo-pump including, a housing, a rotor, an axial boost pump having inducer blades on a first portion of the rotor and vanes on a first portion of the housing, and an axial turbine having turbine blades on a second portion of the rotor, and wherein the housing defines a plurality of feed lines leading into the axial turbine, the plurality of feed lines each including a turn that is radially inboard of the vanes of the boost pump but that does not extend through the vanes.

4. The liquid propellant rocket engine as recited in claim 3, wherein the plurality of feed lines into the axial turbine are fluidly connected with the supply line.

5. The liquid propellant rocket engine as recited in claim 3, wherein the housing defines a pump outlet from the axial boost pump and a turbine outlet from the axial turbine, and the turbine outlet opens into the pump outlet.

* * * * *